Jan. 14, 1958  A. B. VIETH  2,819,806
BATTERY COMPONENT ASSEMBLING MACHINES
Filed Oct. 5, 1953  4 Sheets-Sheet 1
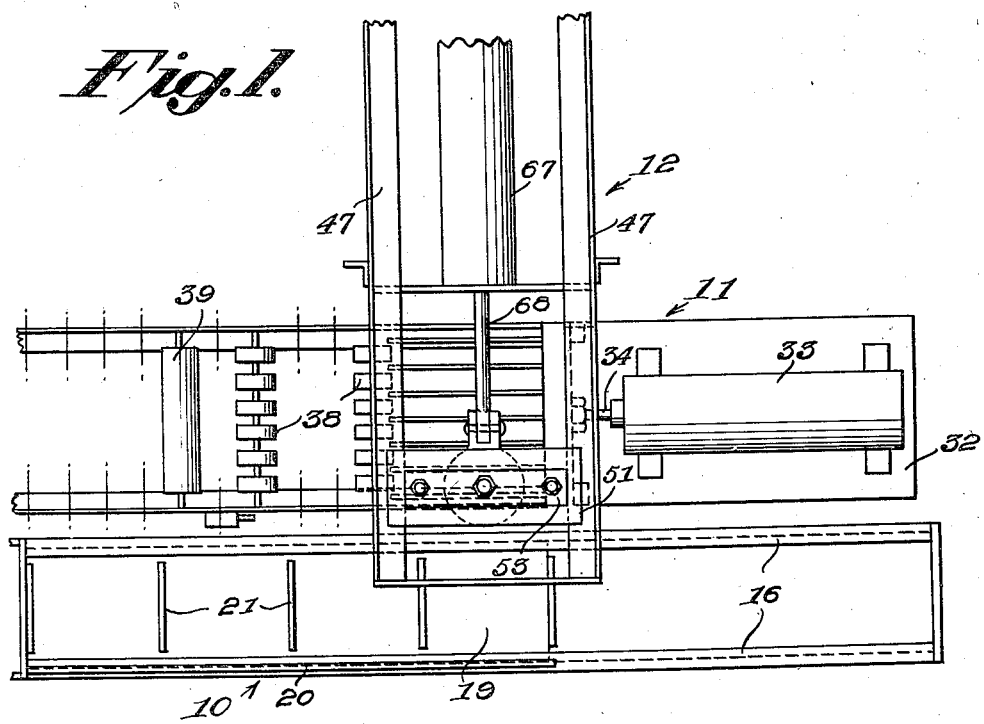
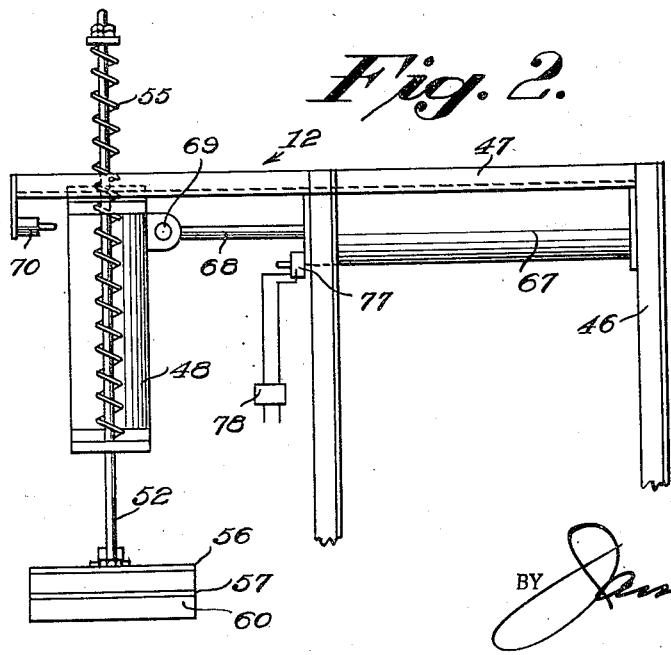
INVENTOR
Albert B. Vieth
BY James Erskine
ATTORNEY Jan. 14, 1958  A. B. VIETH  2,819,806
BATTERY COMPONENT ASSEMBLING MACHINES
Filed Oct. 5, 1953  4 Sheets-Sheet 2
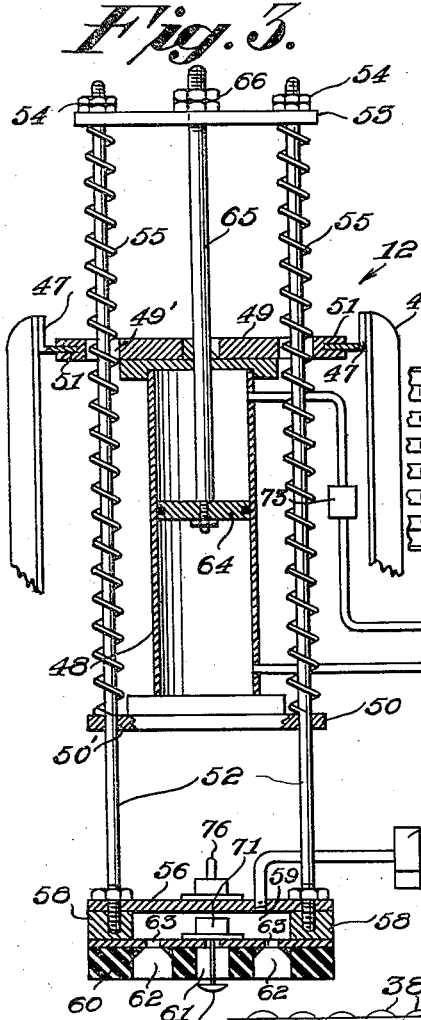
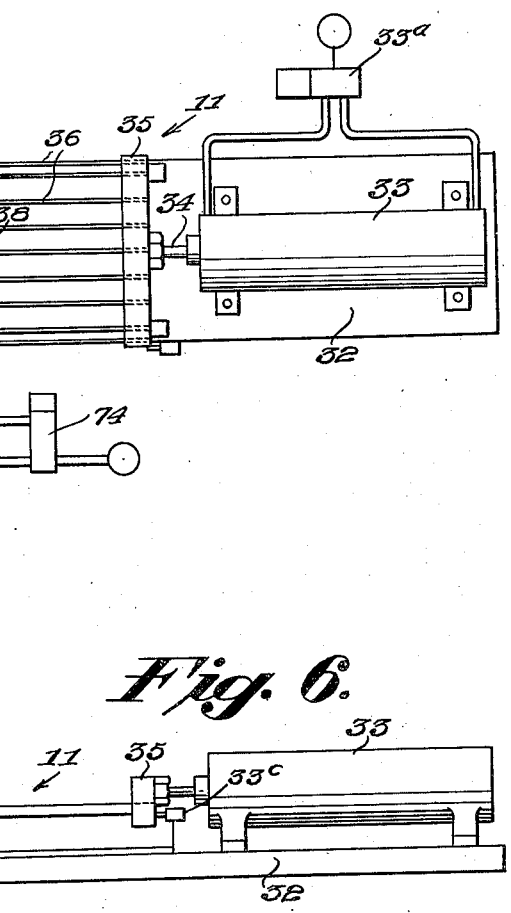
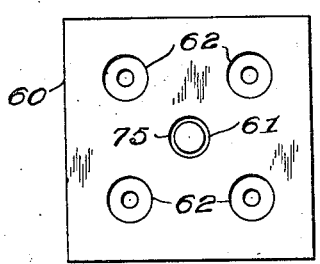
INVENTOR
Albert B. Vieth.
BY
ATTORNEY Jan. 14, 1958 A. B. VIETH 2,819,806
BATTERY COMPONENT ASSEMBLING MACHINES
Filed Oct. 5, 1953 4 Sheets-Sheet 3
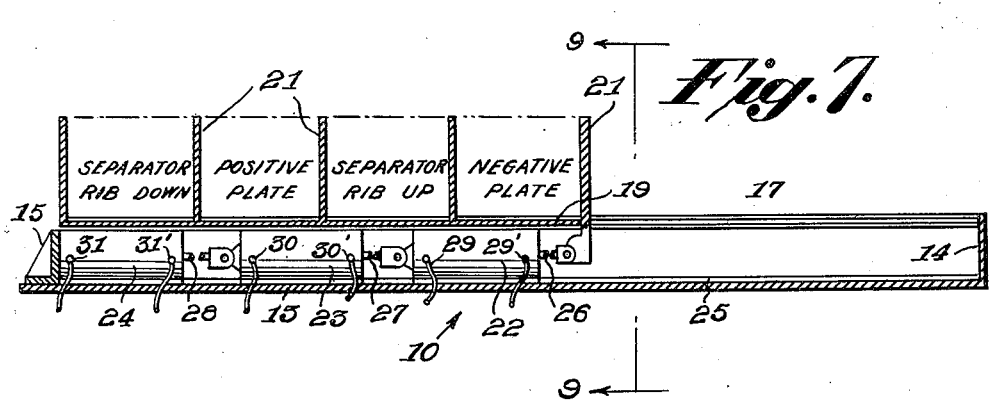
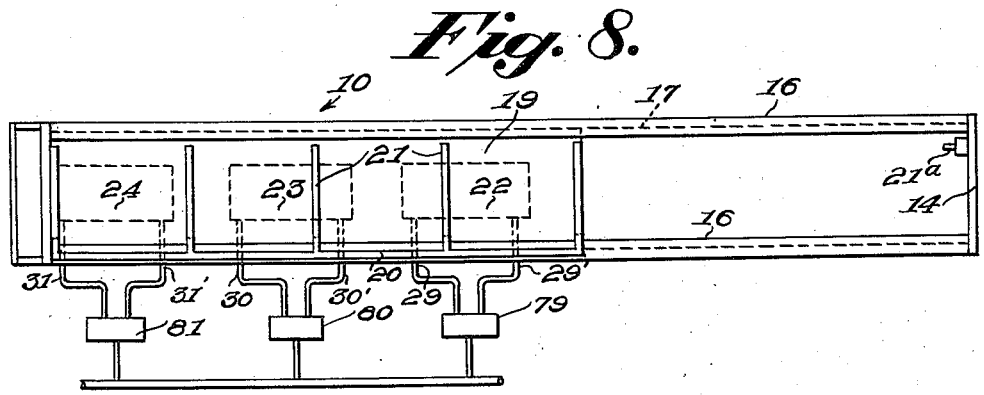
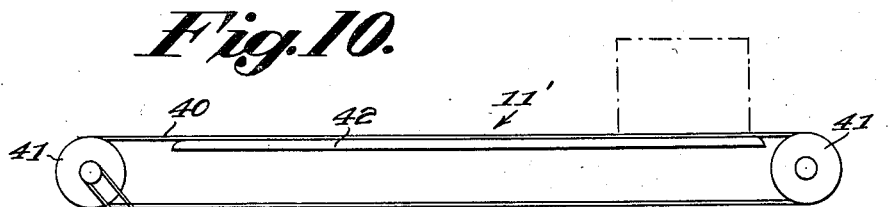
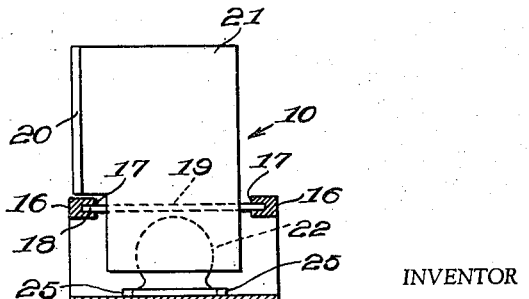
INVENTOR
Albert B. Vieth
BY
ATTORNEY Jan. 14, 1958 A. B. VIETH 2,819,806
BATTERY COMPONENT ASSEMBLING MACHINES
Filed Oct. 5, 1953 4 Sheets-Sheet 4

INVENTOR
Albert B. Vieth

ATTORNEY.

United States Patent Office 2,819,806
Patented Jan. 14, 1958

2,819,806

BATTERY COMPONENT ASSEMBLING MACHINES

Albert B. Vieth, Hamburg, Pa., assignor to Price Battery Corporation, a corporation of Pennsylvania Application October 5, 1953, Serial No. 383,957

1 Claim. (Cl. 214—6)

This invention relates to a battery component assembling machine.

The invention is more particularly concerned with an improved machine for transporting in succession a negative battery plate, a rib-up separator plate, a positive plate, and a rib-down separator plate from respective stacks thereof disposed on a positioning assembly to an assembling and conveying means whereon successive stacks of plates in the said order are provided for introduction into batteries as units.

A principal object of the invention is to provide a battery component assembling machine which is highly compact in arrangement, durable in construction and efficient and dependable in operation.

A further and more specific object of the invention is to provide a battery component assembling machine which includes three cooperating assemblies whereby individual stacks of separator and positive and negative plates are automatically and successively brought into operative association with a suction head operable to transfer the plates in proper sequence to a stacking and conveying assembly.

A further object of the invention is to provide a battery component assembling machine wherein a suction head is supported for movement longitudinally of a component positioning means, normal thereto for lifting successive components therefrom, and laterally of a stacking assembly for stacking of the successive plates thereon.

Other objects and advantages of the invention will become apparent in the course of the following detailed description, taken in connection with the accompanying drawings, wherein:

Figure 1 is a top plan view of the complete battery component assembling machine in accordance with one structural embodiment thereof.

Fig. 2 is a broken side elevational view of the suction head assembly embodied in the machine.

Fig. 3 is a vertical sectional view of the suction head assembly with the supporting frame thereof being broken away.

Fig. 4 is a bottom plan view of the battery component engageable member.

Fig. 5 is a broken top plan view of the component stacking and conveying assembly in one embodiment thereof.

Fig. 6 is a broken side elevational view of the stacking and conveying assembly.

Fig. 7 is a vertical longitudinal sectional view of the component feeding or positioning assembly in one structural embodiment thereof.

Fig. 8 is a top plan view of the component positioning assembly of Fig. 7.

Fig. 9 is a vertical transverse sectional view of the component positioning assembly as observed in the plane of line 9—9 on Fig. 7.

Fig. 10 is a side elevational view of a modified form of stacking and conveying assembly.

Figure 11:
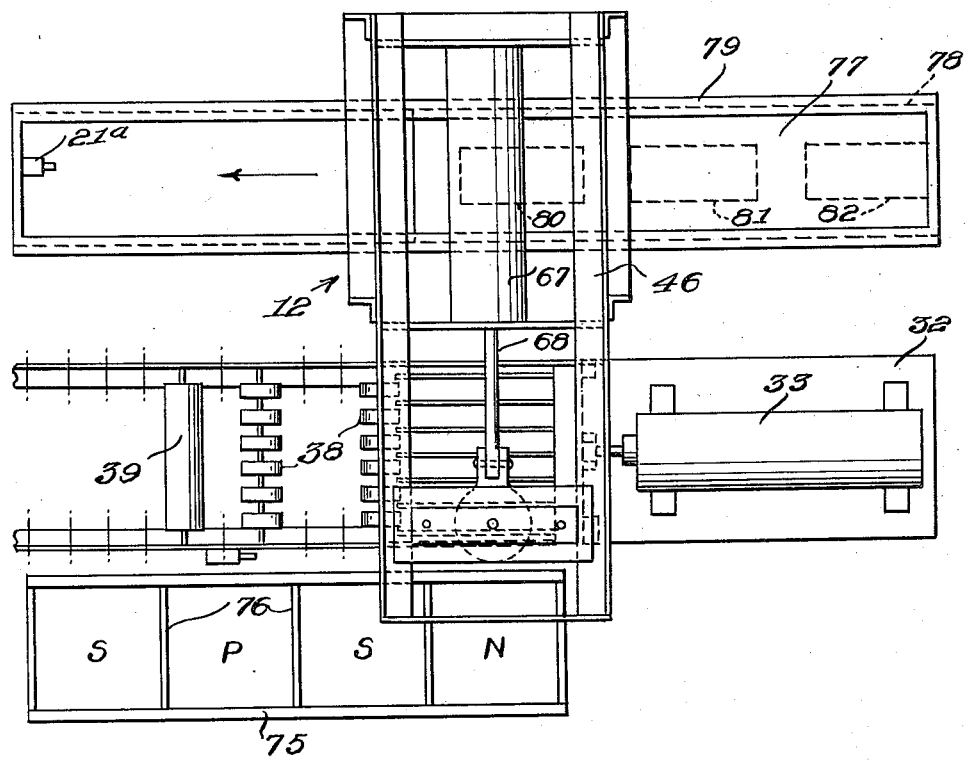
Fig. 11 is a view corresponding to Fig. 1 disclosing a modified construction as respects the component positioning means.

Referring now in detail to the drawings, it is to be observed that the improved machine comprises three different cooperating assemblies, namely, a battery component positioning assembly 10 (Figs. 7, 8 and 9), a battery component stacking and conveying assembly 11 (Figs. 5 and 6), and a suction head assembly 12 (Figs. 2, 3 and 4) for transfer of groups of stacked plates from the component positioning assembly to the component stacking and conveying assembly.

These three cooperating assemblies will now be described in their above stated order except for the valves whose descriptions are being reserved for use in the final statement of the operation of the machine.

Referring now to Figs. 7, 8 and 9, the component positioning assembly 10 comprises an elongated base 13 whose opposite ends are provided with vertical plates 14 and 15, and a pair of laterally spaced and parallel guide rails 16 extend horizontally from one end plate to the other.

The guide rails 16 are provided with inwardly opening channels 17 in which are longitudinally slidably disposed the opposite edge portions 18 of an elongated rectangular plate 19.

The plate 19 is adapted to support four stacks of plates, one stack being negative plates, the next separator rib-up plates, the next positive plates, and the next and last being separator rib-down plates, all as indicated in Fig. 7.

The plate 19 is provided with suitable longitudinal and transverse plate separators and positioners 20 and 21, respectively.

Three pneumatic cylinders 22, 23 and 24 are longitudinally slidably disposed on the base 13 intermediate the guide flanges 25. The cylinder 22 has its piston stem 26 pivotally connected to the foremost transverse separator 21, the cylinder 23 has its piston stem 27 pivotally connected to cylinder 22, and the cylinder 24 has its piston stem 28 pivotally connected to the piston 23, and the cylinder 24 remains stationary in operation with one end thereof backed by the end plate 15. Air is admitted in proper sequence to the different cylinders and at opposite sides of the pistons therein by connections 29, 29', 30, 30', 31 and 31', as hereinafter referred to.

The above described component positioning assembly operates as follows. With the plate 19 in extreme left-hand position as shown, the stack of negative plates is in line to be lifted by the suction head (hereinafter described) and placed to start a stack.

Upon admission of air through connection 29, the plate 19 will be moved one step to the right, whereby the stack of rib-up separator plates will be in position to be lifted by the suction head. Upon admission of air through connection 30, in cylinder 23, the piston stem 27 thereof will move the cylinder 22 and therewith the plate 19 a further step to the right, whereby the stack of positive plates will be in position to be lifted by the suction head.

Upon subsequent admission of air through connection 31 in cylinder 24, the cylinders 22 and 23, together with plate 19, will be advanced a further step, whereby the stack of rib-down separator plates will be in a position to be picked up by the suction head.

To return the plate 19 and the stacks of plates carried thereby to the initial or starting position of Fig. 7, air is admitted through connections 29', 30' and 31' of cylinders 22, 23 and 24 simultaneously, and which is effected by engagement of the positioner 21 with the micro-switch 21ª.

The stacking and conveying assembly 11 (Figs. 5 and 6) comprises a base member 32 on one end of which is supported a pneumatic cylinder 33 having a piston therein in well known manner and from which piston projects a rod 34 whose free end is rigidly connected to a stacking tray comprising a transverse base bar 35 from which project a plurality of teeth 36. The tray is longitudinally slidably disposed on opposite side flanges 37 projecting upwardly from the base 32 and longitudinally sliding movement is imparted to the tray by means of the piston-operated rod 34.

A conveyer is disposed on base 32 for reception of stacked battery components and same comprises a plurality of rollers including a series of necked rollers 38 adjacent the tray, and a further series of rollers 39 (Fig. 1) which are continuously cylindrical from end to end. The purpose of the necked rollers 38 is to permit the tray teeth 36 to enter between same for transfer of a stack of components from the tray to the conveyor.

A modified form of stacking and conveying assembly is illustrated in Fig. 10 which is of substantially simpler form and which in fact is a preferred embodiment. As indicated, the modified form of stacking and conveying assembly 11' comprises an endless belt 40 movable about a pair of spaced rollers 41, and a load-sustaining plate 42 is disposed beneath the upper run of the belt. One of the rollers 41 is driven by a belt 43 from a gear reduction unit 44 which in turn is driven by a suitable motor 45. The belt 40 is, of course, moved intermittently, it being at rest during a stacking operation and for which purpose suitable switch control means may be associated with the motor 45.

The suction head assembly 12 (Figs. 2, 3 and 4) comprises a supporting frame 46 including a pair of laterally opposed longitudinal guide bars 47.

A vertically disposed pneumatic cylinder 48 is rigidly supported between upper and lower plates 49 and 50, the former of which is provided with opposite edge grooves 51 in which the guide bars 47 are received whereby the cylinder 48, together with plates 49 and 50, are movable as a unit longitudinally of the guide bars 47. A pair of vertically disposed rods 52 extend loosely through apertures 49' and 50' in the plates 49 and 50, respectively, and a plate 53 is supported on the upper ends of rods 52 against upward movement by nuts 54.

A coil spring 55 encircles each rod 52, extends through a respective aperture 49' and has its opposite ends bearing on plates 50 and 53.

Secured to the lower ends of rods 52 is a component contacting member including an upper plate 56 and a lower plate 57 between which is disposed marginal spacers 58 providing an air chamber 59 between the plates 56 and 57. Disposed beneath the plate 57 and suitably secured thereto is a soft rubber component contacting and gripping pad 60. The pad 60 is provided with a central aperture 61 for a purpose later referred to. The pad is further provided with rectangularly arranged suction apertures 62 which communicate with the air chamber 59 through apertures 63 in the plate 57.

A piston 64 is disposed within the cylinder 48 and a rod 65 projects from the piston through the upper end of cylinder 48 and has its upper end secured to plate 53 by nuts 66.

It is to be observed that the cylinder 48 and attaching plates 49 and 50 are vertically fixed and that the rods 52, plate 53, component contacting member 60 and piston 64 are vertically movable as a unit except for the yield of springs 55 upon engagement of the contacting member with a stack of components.

The suction head assembly further comprises a horizontal pneumatic cylinder 67 supported by frame 46 and which is provided with a piston rod 68 having its outer end pivotally connected to the vertical cylinder 48 as indicated at 69.

The purpose of cylinder 67 is to impart horizontal movement to the cylinder 48, plates 49, 50 and elements associated therewith.

Having described the general structure of the machine, the operation thereof is as follows:

When the suction head is down in its battery component pick-up position, the micro-switches 70 and 71 are closed, the suction valve 72 is open and the sensing valve 73 reverses the three-way valve 74 for reversing the action of piston 64 and moving the component-gripping member up.

If the component-engageable finger 75 opens switch 71 to signal that the head is not carrying a battery component, the three-way valve 74 is reversed to lower the head and repeat the foregoing operation, which will be repeated as often as required until the suction head is conveying a battery component.

The suction head continues its vertical movement until micro-switch 76 is closed and the head then moves in a horizontal direction until the micro-switch 77 is closed. The micro-switch 77 reverses the travel of the head from the horizontal to downward vertical movement over the tray 35—36, actuates the electronic counter 78 which actuates the three-way valve 79 to power the pneumatic cylinder 22 and thereby move the plate 19 one step to bring the rib-up separator stack into position to be picked up by the suction head.

The three-way valves 80 and 81 are subsequently actuated to power the pneumatic cylinders 23 and 24, and upon complete forward advance of the plate 19 the switch 21ª is contacted for return of the plate to the normal position in Fig. 8.

The stacking and conveying assembly 11 is actuated by the three-way valve 33ª which is controlled by the micro-switches 33ᵇ and 33ᶜ which are engageable by the stacking and conveying assembly in its two extreme positions.

In the embodiment of the invention as illustrated in Fig. 11, the individual stacks of negative plates, separator rib-up plates, positive plates and separator rib-down plates are supported in a fixed position and the suction head assembly 12 is movable longitudinally of the row of stacked plates instead of the stacks of plates being movable relatively to the suction head assembly as in the first form of the invention.

For this purpose, the successive stacks of plates are stationarily supported on a table 75 provided with suitable plate separators 76.

The suction head assembly 12 is of the same construction as in the first form of the invention except that the frame 46 thereof is supported by a plate 77 which corresponds to the plate 19 in Figs. 7 and 8 and which is mounted in horizontal slideways 78 in guide rails 79 similar to the guide rails 16 in Figs. 7, 8 and 9 whereby the plate 77 and the suction head frame 46 are movable in unison longitudinally of the table 75.

The plate 77 is moved by cylinders 80, 81 and 82 in the same manner as are the corresponding cylinders 22, 23 and 24 in Figs. 7, 8 and 9.

It will be obvious from the above description that the suction head assembly 12 in accordance with the embodiment of Fig. 11 has movement in three different directions, and which are as follows: Vertical plate lifting movement, fore and aft, movement for deposit of plates on the stacking assembly 11 and movement longitudinally of the table 75 for selection of plates from the successive stacks thereon.

Figure 12:
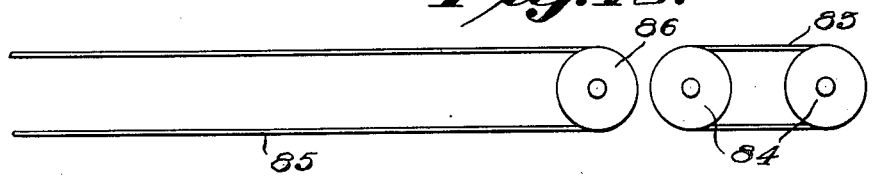
Fig. 12 is a diagrammatic side elevational view of a modified form of stacking and conveying means.

While the stacking assembly is shown as embodying rollers, same may comprise an endless belt 83 (Fig. 12) movable over suitably driven rollers 84 and a relatively long endless conveyor belt 85 in alignment with belt 83 may be utilized to convey the stacks of plates away from the stacker belt 83. The conveyor belt 85 may be mounted on rollers 86 (only one of which is shown).

In the operation of the three different forms of stacker disclosed as in Figs. 5 and 6 and Figs. 10 and 12, suitable means may be provided for discharge of a stack of plates to the conveying means and which may comprise a magnetic ratchet device which is rotatable one point each time a plate is deposited on the stacking table or belt. When the required number of plates have been stacked the said device will operate to open the stacking circuit and clase the circuit to discharge the stacked plates onto the conveyor belt, and then reclose the stacking circuit for another stacking cycle.

Having described my invention in accordance with preferred structural embodiments thereof, what I claim and desire to secure by U. S. Letters-Patent is:

Means for supporting a plurality of stacks of battery plates and for positioning successive ones of said stacks at a single pick-up station, comprising an elongated frame, said frame being provided with laterally opposed guide channels, a component supporting plate for said stacks having opposite edges thereof received in said channels for movement thereof longitudinally of the frame, said frame including a base disposed below said plate, laterally opposed guide flanges on said base, a plurality of pneumatic cylinders having guide portions in longitudinal slidable engagement with said guide flanges, and a pneumatic cylinder immovably supported on said base rearwardly of said slidable cylinders, a piston stem connection between the foremost cylinder and said plate, and piston stem connections between adjacent ends of all of said cylinders, said plate being provided with a longitudinal vertical wall at one edge thereof and a plurality of longitudinally spaced vertical members projecting right-angularly from said wall and providing therewith pockets for receiving stacks of battery plates.

References Cited in the file of this patent

UNITED STATES PATENTS

| | | |
|---|---|---|
| 691,692 | Von Zweigbergk | Jan. 21, 1902 |
| 1,749,620 | Winslow | Mar. 4, 1930 |
| 1,941,106 | Park | Dec. 26, 1933 |
| 2,301,892 | Lewis | Nov. 10, 1942 |
| 2,324,523 | Lund | July 20, 1943 |
| 2,626,038 | Smith | Jan. 20, 1953 |
| 2,704,593 | Galloway | Mar. 22, 1955 |